United States Patent Office 3,326,643
Patented June 20, 1967

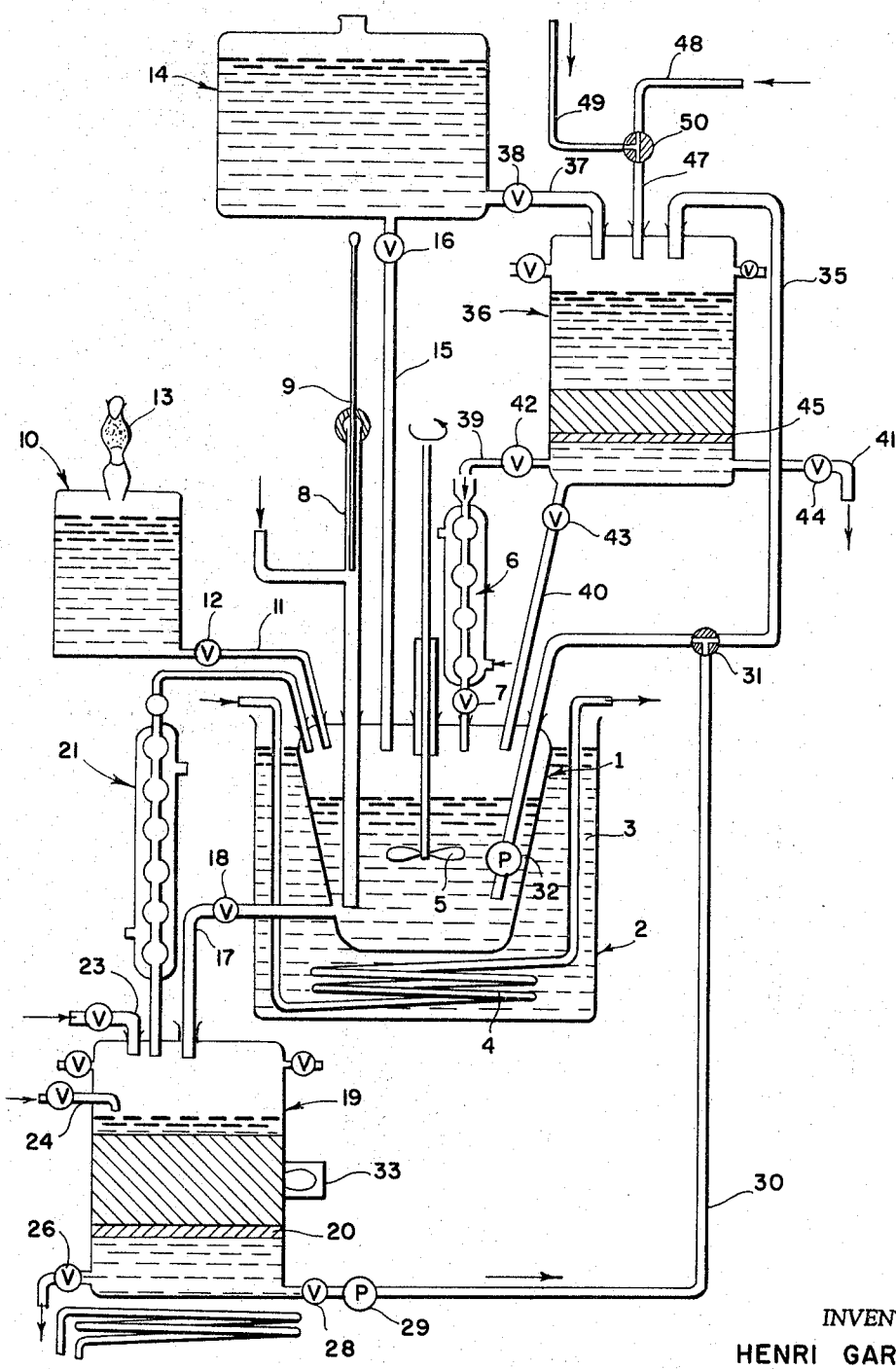

3,326,643
METHODS OF PREPARING THIOTRITHIAZYL CHLORIDE
Henri Garcia, Bagneux, France, assignor to Centre National de la Recherche Scientifique (French Government Administration), Paris, France, a society of France
Filed Aug. 5, 1963, Ser. No. 299,836
Claims priority, application France, Aug. 9, 1962, 906,509
1 Claim. (Cl. 23—357)

It is known that thiotrithiazyl chloride ($ClS_4N_3$) has already been prepared by E. Demarcay (Comptes rendus Académie des Sciences, 1880, volume 91, pages 854 and 1066) by reaction at high temperature, in chloroform, between sulfur chloride $Cl_2S_2$ and nitrogen sulfide $S_4N_4$. Thiotrithiazyl chloride, which is a crystalline body of bright yellow color insoluble in organic solvents precipitates from the chloroform solution as it is being formed. However, such a method has for its drawback that it requires preparing and separating in advance nitrogen sulfide, $S_4N_4$, in a very pure state, which is particularly difficult because the reaction giving said nitrogen sulfide (action of ammonia on sulfur chloride) also produces important amounts of sulfur and of ammonium chloride which are very difficult to separate from the nitrogen sulfide that is formed.

The object of the present invention is to provide a method which is free from this drawback. For this purpose I eliminate the step of insulating nitrogen sulfide, $S_4N_4$, an intermediate product necessary for the production of thiotrithiazyl chloride, this method making possible an industrial manufacture of the above mentioned chloride, which has proved a valuable product in view of its insecticide properties.

According to my invention I cause, in a first step, gaseous ammonia to react, at a temperature lower than 35° C. on sulfur monochloride dissolved in an organic solvent of nitrogen sulfide but not of ammonium chloride. The solution of nitrogen sulfide thus formed, is separated from the solid phase, which consists of ammonium chloride and sulfur in excess. During a second step of the method I cause the nitrogen sulfide solution to react, at boiling temperature, with a further amount of sulfur monochloride to produce thiotrithiazyl chloride, which precipitates from the solution and can be collected by filtration.

The organic solvent above referred to may consist of cyclohexane, chloroform, carbon tetrachloride, either alone or mixed with chloroform, trichlorethylene.

However I preferably make use of cyclohexane, which has proved to be the best solvent of nitrogen sulfide whereas not only ammonium chloride but also sulfur are quite insoluble therein, in the cold state. Thus during the first step of the method I obtain a practically pure solution of nitrogen sulfide, free from ammonium chloride and from sulfur.

When use is made of one of the other solvents above referred to, some amount of sulfur will remain in solution with the nitrogen sulfide formed during the first step of the method. It will therefore be necessary during the second step to maintain a volume of the solution, during the whole of the reaction, such that sulfur does not precipitate together with thiotrithiazyl chloride. A washing thereof with an excess of the solvent may however be useful to dissolve the small amount of sulfur that would be precipitated despite the precautions that have been taken.

A preferred embodiment of the present invention will be hereinafter described with reference to the appended drawings, given merely by way of example, and in which:

The only figure shows an apparatus for carrying out the method according to my invention.

This figure shows a vessel 1, for instance of glass capable of resisting quick temperature variations, of a capacity of about ten liters, located in a second vessel 2 containing a thermostatic liquid 3, for instance water, kept at a suitable temperature by means of a coil 4. Vessel 1 is fitted with a stirring device 5 and several tubes communicating with said vessel 1 are provided for the inflow and outflow of products participating in the reaction.

A reflux cooler 6 provided with a cock 7 and opening into the upper part of vessel 1 is connected with the upper part of vessel 1 for introduction thereinto of a liquid such as a solvent.

A bent tube 8 also opens into vessel 1 for the feed of gaseous ammonia. A glass rod 9 is slidable in tube 8 to prevent stoppage thereof at the point where ammonia comes into contact with sulfur monochloride $Cl_2S_2$. A vessel 10 containing $Cl_2S_2$ is disposed in such manner as to feed said chloride by gravity to vessel 1 through a tube 11 provided with a cock 12. At its upper part, vessel 10 is provided with a hollow plug 13 containing a dehydrating substance such as calcium chloride, in order to prevent the inflow of moist air. The solvent used in the method according to the present invention is placed in a vessel 14, located above vessel 1, to which it is connected by a tube 15 provided with a cock 16. The lower portion of vessel 1 communicates through a tube 17, provided with a cock 18, with a vessel 19 provided with a filter 20. This vessel 19 can further receive, through a downwardly extending cooler 21, a liquid vaporized in the top part of vessel 1. At the top of vessel 19 are also provided a water inlet tube 23 and a dry and hot air inlet tube 24. Its bottom is provided with a drain cock 26 and with an outflow tube 30 fitted with a cock 28 and with a pump 29. This tube 30 has its upper end connected, through a three-way cock 31, with a second pump 32 located in vessel 1. The cake formed by filter 20 can be compacted by means of a vibrating device 33 of a conventional type.

The contents of vessel 1 may also be sent by pump 32, through a portion of tube 30 and a tube 35, to a vessel 36 located at a height intermediate between those of vessels 1 and 14. This vessel 36 can also receive solvent from vessel 14 through a tube 37 provided with a cock 38. At its bottom, vessel 36 is provided with three nozzles 39, 40 and 41, respectively provided with cocks 42, 43 and 44.

Nozzle 39 connects vessel 36 with vessel 1 through cooler 6.

Nozzle 40 also connects vessel 36 with vessel 1, but directly.

Finally nozzle 41 serves to drain out vessel 36.

In the middle portion of vessel 36 there is provided a filter 45, intended in particular to receive the thiotrithiazyl chloride that is formed.

Finally a pipe 47, opening into the top portion of vessel 36, is connected to two tubes 48, 49 through a three-way cock 50 so as to permit either of sending dry and hot air into said vessel 36 or to make a partial vacuum therein.

The operation of this apparatus will now be described in the case of a particular example of the method according to the present invention.

Vessel 14 is filled in advance with cyclohexane and vessel 10 with sulfur monochloride $Cl_2S_2$.

I introduce into reaction vessel 1 seven liters of cyclohexane supplied from vessel 14 and 710 gr. (423 ml.) of sulfur chloride supplied from vessel 10. Cocks 16, 12 and 18 are closed. Ammonia is then made to bubble in the solution of sulfur chloride, said ammonia in the gasous state being introduced into vessel 1 through tube 3 at the rate of 65 liters per hour. The beginning of the reaction may be violent and it is necessary to cool down to a temperature below 35° C. the solution in vessel 1. For the sake of safety and chiefly during the first hours of the reaction, I keep the cock 7 of cooler 6 open and I avoid stopping of conduit 8 by means of rod 9. In order to prevent the mass in vessel 1 from becoming viscous, I introduce into said vessel 1, by small amounts during the reaction, two supplementary liters of cyclohexane. The reaction liquor first takes a brown shade, shifts to dirty green and finally becomes rose, which indicates that this step of the method is finished. The total duration of this step averages eight hours in the conditions above stated.

The solution that is obtained is a solution of nitrogen sulfide $S_4N_4$ in cyclohexane containing in the solid state sulfur and ammonia chloride. Cock 18 is opened so that the whole of the suspension passes into vessel 19. The solid products are then retained by filter 20 and settled by means of vibrating device 33 whereas the red solution of nitrogen sulfide in cyclohexane collects at the bottom of vessel 19 (valve 26 being closed). Pump 29 is then started, cock 28 being opened. Three-way cock 31 may be used either to feed back the solution into vessel 1 so as to collect the remainder of the suspension that may have remained therein or preferably to send the whole into vessel 36 (cocks 42 and 43 being closed). The cake that has settled on filter 20 is washed with fresh solvent, in particular when the red solution has been stored in vessel 36, this solvent being introduced into vessel 1, for washing it and subsequently sent into vessel 19, either directly through conduit 17 or through distillation column 21 when valve 18 is closed. All the $S_4N_4$ is known to have been extracted from the cack formed on filter 20 when the solution that has passed therethrough remains colorless.

The solution stored in vessel 36 is then passed into vessel 1 by opening cock 43 and there is also introduced into said vessel 1 a further amount of sulfur chloride (500 ml.) from vessel 10. The contents of vessel 1 is heated to the boiling point during one hour, the cock 7 of cooler 6 being open so as to condense and return to vessel 1 the vapors of cyclohexane that are formed. The whole is allowed to cool down, and, after four hours, thiotrithiazyl chloride has decanted at the bottom of the vessel. The matters in this vessel are stirred and the suspension of thiotrithiazyl is caused by pump 32 to rise up into vessel 36. The product that is formed is retained on filter 35 whereas the liquid phase is returned to vessel 1. The cake of thiotrithiazyl chloride is washed with hot solvent so as to dissolve and to carry along the sulfur that might have remained dissolved in the solution at the end of the first step of the method and which would have crystallized with the thiotrithiazyl chloride after cooling of the suspension thereof.

I extract from vessel 36, after drying in hot air, 144 gr. of $ClS_4N_2$ of a purety of 98%. The yield of manufacture is above 50%.

Among the advantages of the method that forms the object of the present invention may be cited the fact that it uses as starting materials ammonia and sulfur chloride which are common products to be found on the market. Furthermore, according to the preferred embodiment, use is made of cyclohexane which is a good industrial solvent, cheap, having a low boiling point, to wit 81.4° C., of low density, 0.778, and of low viscosity. It facilitates both of the steps of the method, improves the quality of the final product and also the yield. On the other hand the solvent is nearly fully recovered after every operation. It is not necessary to perform a preliminary separation of nitrogen sulfide nor of the solid mixture containing this compound.

In a general manner, while I have in the above description disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claim.

What I claim is:

A method of preparing thiotrithiazyl chloride $ClS_4N_3$ which comprises, during a first step causing gaseous ammonia to react, at a temperature not higher than 35° C. on sulfur monochloride dissolved in cyclohexane and separating the solution of nitrogen sulfide from the solid phase, which comprises ammonium chloride, during a second step causing directly said nitrogen sulfide solution to react, at boiling temperature, with a further amount of sulfur monochloride to produce thiotrithiazyl chloride which precipitates from the solution and collecting it by filtration.

References Cited

Mellor: Comprehensive Treatise on Inorganic and Theoretical Chemistry (1928), vol. 8, p. 624.

Goehering: Progress In Inorganic Chemistry (1959), vol. I pp. 217, 221–224.

Demarcay: Comples Rendus Academie des Sciences (1880), vol. 91, pp. 1066–7, Q46A14. Copy available Library U.S. Patent Office.

Meuwsen: Zeitschrift for Anorganische Chemie (1950), vol. 263, pp. 200–5.

OSCAR R. VERTIZ, *Primary Examiner.*

MAURICE A. BRINDISI, *Examiner.*

R. M. DAVIDSON, M. WEISSMAN, *Assistant Examiners.*